United States Patent
Shrivastava et al.

(10) Patent No.: US 11,394,606 B2
(45) Date of Patent: Jul. 19, 2022

(54) AUTO-PROVISIONING OF SD-WAN HUBS AND SPOKES

(71) Applicant: Cisco Technology Inc., San Jose, CA (US)

(72) Inventors: Gaurav Shrivastava, Fremont, CA (US); Alfred C. Lindem, III, Cary, NC (US); Ravi Kiran Chintallapudi, Pleasanton, CA (US); Torsha Banerjee Das, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/883,103

(22) Filed: May 26, 2020

(65) Prior Publication Data
US 2021/0377109 A1 Dec. 2, 2021

(51) Int. Cl.
*H04L 41/0806* (2022.01)
*H04L 45/00* (2022.01)
*H04L 12/28* (2006.01)
*H04L 67/10* (2022.01)

(52) U.S. Cl.
CPC ......... *H04L 41/0806* (2013.01); *H04L 45/34* (2013.01); *H04L 12/2854* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,670,351 B2 | 3/2014 | Hajiaghayi et al. | |
| 8,897,718 B2 | 11/2014 | Manea et al. | |
| 10,355,989 B1* | 7/2019 | Panchal | H04L 67/10 |
| 10,592,829 B2 | 3/2020 | Mueller | |
| 10,715,419 B1* | 7/2020 | Suryanarayana | H04L 45/507 |

(Continued)

FOREIGN PATENT DOCUMENTS

EP 3 435 599 A1 1/2019

OTHER PUBLICATIONS

PCT Notification of Transmittal of the International Search Report and the Written Opinion of the International Searching Authority, or the Declaration, re Intl. Appln. PCT/US2021/032849, dated Sep. 16, 2021.

*Primary Examiner* — Scott B Christensen
(74) *Attorney, Agent, or Firm* — Baker Botts, LLP

(57) ABSTRACT

The present disclosure is directed to systems and methods for auto-provisioning hubs and spokes in a SD-WAN network, and includes the performance of operations and/or the steps of receiving first information from a first network hub, the first network hub one of a plurality of network hubs, the first information indicating a first set of properties associated with the first network hub; publishing the first information to a plurality of network spokes, the plurality of network spokes determining whether to subscribe to the first network hub based on the first information; receiving subscription information from a first network spoke of the plurality of network spokes, the subscription information indicating the first network spoke subscribing to the first network hub; and creating at least one dynamic control policy to establish a forwarding path for the first network spoke through the first network hub.

20 Claims, 5 Drawing Sheets

(56) References Cited

U.S. PATENT DOCUMENTS

| | | | |
|---|---|---|---|
| 2009/0097417 A1* | 4/2009 | Asati | H04L 45/02 370/255 |
| 2010/0054245 A1* | 3/2010 | Asati | H04L 45/16 370/390 |
| 2011/0069634 A1 | 3/2011 | Hajiaghayi et al. | |
| 2015/0189688 A1* | 7/2015 | Joslyn | H04W 40/244 455/73 |
| 2016/0308762 A1* | 10/2016 | Teng | H04L 12/4641 |
| 2018/0343146 A1* | 11/2018 | Dunbar | H04L 45/42 |
| 2019/0109785 A1* | 4/2019 | Chunduri | H04L 45/54 |

* cited by examiner

AUTO-PROVISIONING OF SD-WAN HUBS AND SPOKES

TECHNICAL FIELD

The present disclosure generally relates to software defined wide area networks (SD-WAN), and more specifically to systems and methods for auto-provisioning of SD-WAN hubs and spokes.

BACKGROUND

Large enterprises may have multiple physical or virtual sites located in different geographical locations or in public or private clouds. In a mesh topology, every physical site is connected to every other physical site using wide area network (WAN) links. For enterprises having hundreds or thousands of physical sites, a full-mesh topology may be highly redundant and may prove difficult to maintain. In a hub and spoke topology, at least one physical site may act as a hub while other physical sites may act as spokes. Spoke to spoke traffic may be provisioned through a designated hub.

DESCRIPTION OF EXAMPLE EMBODIMENTS

Overview

Figure 1:
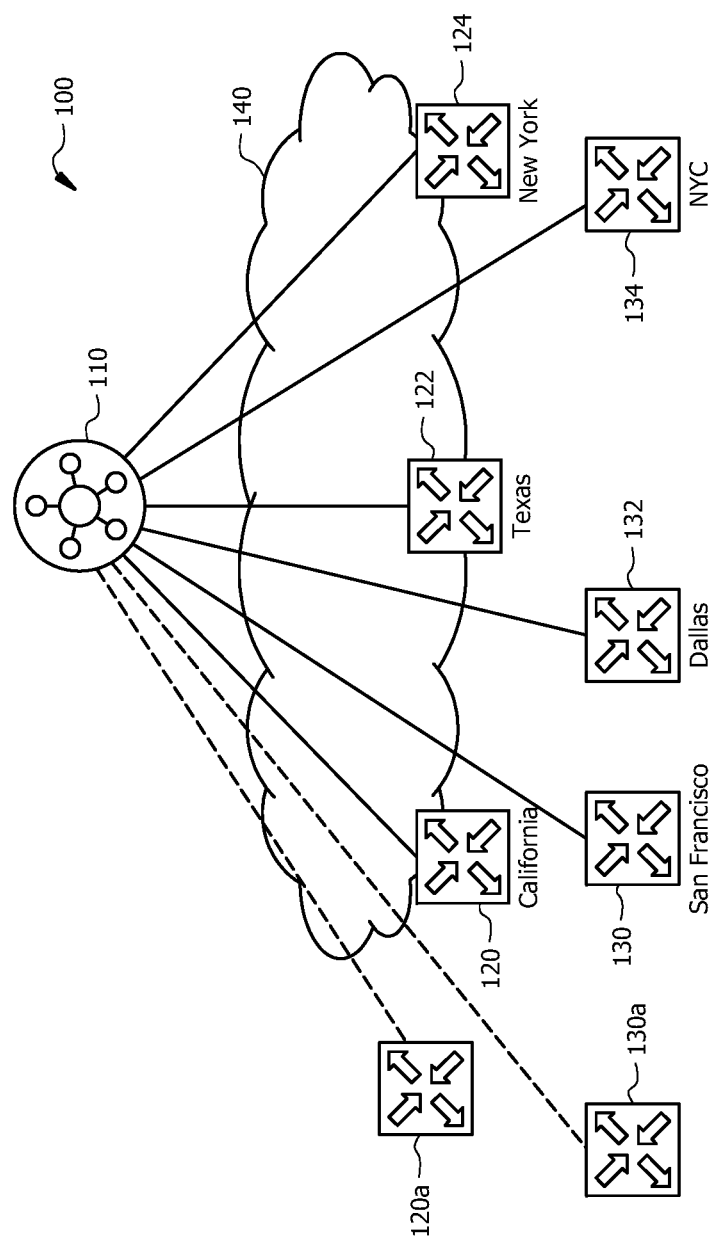
FIG. 1 illustrates a system for auto-provisioning SD-WAN hubs and spokes, in accordance with certain embodiments.

According to an embodiment, a system may include one or more processors and one or more computer-readable non-transitory storage media comprising instructions that, when executed by the one or more processors, cause one or more components of the system to perform operations including, receiving first information from a first network hub, the first network hub one of a plurality of network hubs, the first information indicating a first set of properties associated with the first network hub, publishing the first information to a plurality of network spokes, the plurality of network spokes determining whether to subscribe to the first network hub based on the first information, receiving subscription information from a first network spoke of the plurality of network spokes, the subscription information indicating the first network spoke subscribing to the first network hub, and creating at least one dynamic control policy to establish a forwarding path for the first network spoke through the first network hub.

Moreover, the first set of properties includes one or more of a GPS location, a load factor, a platform, and at least one cloud characteristic associated with the first network hub.

Additionally, the at least one dynamic control policy further establishes a second forwarding path between the first network hub and at least one other network hub of the plurality of network hubs. The at least one dynamic control policy further establishes a third forwarding path between the at least one other network hub and a second network spoke associated with the at least one other network hub. Further, traffic is engineered through the plurality of network hubs and the plurality of network spokes based on the created at least one dynamic control policy.

Moreover, the operations may include publishing the first information to at least one new network spoke, the at least one new network spoke in geographic proximity to the first network hub of the plurality of network hubs, receiving new subscription information from the at least one new network spoke, the new subscription information indicating the at least one new network spoke subscribing to the first network hub based on the first information, and creating a new dynamic control policy to establish a new forwarding path for the at least one new network spoke through the first network hub.

Additionally, the operations may include receiving second information from a new network hub, the second information indicating a second set of properties associated with the new network hub; publishing the second information to the plurality of network spokes, the plurality of network spokes determining whether to subscribe to the new network hub based on the second information, receiving updated subscription information from at least one network spoke of the plurality of network spokes, the updated subscription information indicating the at least one network spoke of the plurality of network spokes subscribing to the new network hub, and updating the dynamic control policy based on the updated subscription information to establish an updated forwarding path for the at least one network spoke through the new network hub.

According to another embodiment, a method may include the steps of receiving first information from a first network hub, the first network hub one of a plurality of network hubs, the first information indicating a first set of properties associated with the first network hub; publishing the first information to a plurality of network spokes, the plurality of network spokes determining whether to subscribe to the first network hub based on the first information; receiving subscription information from a first network spoke of the plurality of network spokes, the subscription information indicating the first network spoke subscribing to the first network hub; and creating at least one dynamic control policy to establish a forwarding path for the first network spoke through the first network hub.

According to yet another embodiment, one or more computer-readable non-transitory storage media may embody instructions that, when executed by a processor, cause the performance of operations, including receiving first information from a first network hub, the first network hub one of a plurality of network hubs, the first information indicating a first set of properties associated with the first network hub; publishing the first information to a plurality of network spokes, the plurality of network spokes determining whether to subscribe to the first network hub based on the first information; receiving subscription information from a first network spoke of the plurality of network spokes, the subscription information indicating the first network spoke subscribing to the first network hub; and creating at least one dynamic control policy to establish a forwarding path for the first network spoke through the first network hub.

Technical advantages of certain embodiments of this disclosure may include one or more of the following. The systems and methods described herein may allow for the auto-provisioning of hubs and spokes in a network configured in a hub/spoke topology. According to the present disclosure, hub capability may be advertised, spokes may discover and subscribe to a hub, and a dynamic control policy may be generated for each hub to spoke connection. The present disclosure may allow scalability of a network with little intervention and management by network operators.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

As the global workforce grows increasingly mobile, remote users access internet- and intranet-based enterprise resources by way of software-defined wide area networks (SD-WANs). Deployed as a virtual overlay to an existing network topology, a SD-WAN uses software-defined concepts for distributing traffic across a wide area network. SD-WAN networks are rapidly growing, with new branch sites constantly added to the network. Conventionally, each time a branch site is to be added, a network administrator must carefully architect the traffic engineering policies associated with the branch site on a controller. In a full-mesh topology, this may become increasingly tedious as hundreds or thousands of connections may need to be engineered. While a hub and spoke topology is somewhat more manageable, conventional systems nevertheless require a manual set-up of each hub and spoke connection by a network administrator. The present disclosure allows for the dynamic auto-provisioning of hubs and spokes in a hub/spoke topology in a SD-WAN network, including by advertising hub capability, allowing for the discovery and selection of hubs by spokes, and automatically generating centralized control policies.

FIG. 1 depicts a system 100 for auto-provisioning SD-WAN hubs and spokes, according to the present disclosure. System 100 may include a plurality of network hubs 120, 122, 124. In an embodiment, the plurality of network hubs 120, 122, 124 may correspond to routers located in regional offices of an enterprise. Each network hub of the plurality of network hubs 120, 122, 124 may be associated with a particular geographical region. By way of example, the first network hub 120 may be physically located or virtually located (in a public or private cloud) in California; the second network hub 122 may be physically located or virtually located (in a public or private cloud) in Texas; and the third network hub 124 may be physically located or virtually located (in a public or private cloud) in New York. Each of the plurality of network hubs 120, 122, 124 may be associated with a set of properties. For a given network hub of the plurality of network hubs 120, 122, 124, the set of properties may include one or more of the following: a global positioning system (GPS) location of the given network hub, its load factor, its platform, its cloud characteristics (such as cloud affinity), and the like. The load factor is the current or average computation of the bandwidth load on the network hub. The platform refers to the specific physical or virtual platform of the network hub which is associated with a set of capacity parameters, which may include the maximum forwarding capacity, number of central processing units (CPUs), and amount of memory of the network hub. Cloud characteristics refer to the network hub's proximity or affinity with a set of cloud applications. For example, a network hub may be co-located with Office 360 or Salesforce applications.

The system 100 may further include a plurality of network spokes 130, 132, 134. In an embodiment, the plurality of network spokes 130, 132, 134 may correspond to routers in the branch offices of an enterprise. Each network spoke 130, 132, 134 may be in physical or virtual geographic proximity to a particular network hub. By way of example, the first network spoke 130 may be located in a branch office in San Francisco and may be located in geographic proximity to the first network hub 120 in California. The second network spoke 132 may be a branch office in Dallas and may be located in geographic proximity to the second network hub 122 in Texas. The third network spoke 134 may be a branch office in New York City and may be located in geographic proximity to the third network hub 124 in New York.

The plurality of network hubs 120, 122, 124 and the plurality of network spokes 130, 132, 134 may be configured to communicate with a controller 110 and to communicate with one or more of the plurality of network hubs 120, 122, 124 and one or more of the plurality of network spokes 130, 132, 134 via network 140.

In operation, each network hub of the plurality of network hubs 120, 122, 124 may advertise its capability to operate as a hub, as well as its properties, to the controller 110. Specifically, the controller 110 may receive "first information" from at least one network hub from the plurality of network hubs 120, 122, 124. First information may correspond to one or more properties (a GPS location, a load factor, a hub platform, at least one cloud characteristic, etc.) of the first network hub 120. For purposes of illustration, the present disclosure will describe the controller receiving the first information from the first network hub 120, but it is to be understood that the controller 110 may receive the described information from any of the network hubs from the plurality of network hubs 120, 122, 124. Next the controller 110 may publish the first information to the plurality of network spokes 130, 132, 134. Each of the plurality of network spokes 130, 132, 134 may apply its own local policy to determine whether to subscribe to the first network hub 120 based on the first information. For example, the first network spoke 130 may apply a local policy to determine, based on the GPS location and load factor of the first network hub 120, that it desires to subscribe the first network hub 120. The first network spoke 130 may designate the first network hub 120 as its primary hub, and may designate another network hub (such as second network hub 122) as its secondary or backup hub. The first network spoke 130 may transmit its subscription information (i.e., information indicating subscribing by the first network spoke 130 to the first network hub 120 and/or second network hub 122) to the controller 110.

The controller 110 may receive the subscription information from the first network spoke 130 and may create a dynamic control policy and apply it to the first network spoke 130. The dynamic control policy may establish a communication link between the first network spoke 130 and the first network hub 120, i.e., a forwarding path for the first network spoke 130 through the first network hub 120. While the present disclosure describes the operation of the system 100 with respect to the first network hub 120 and the first network spoke 130, it is to be understood that the concepts described herein may be applied to any of the plurality of network hubs 120, 122, 124 and network spokes 130, 132, 134 of system 100.

In an embodiment, the controller 110 may create another dynamic control policy to establish a second forwarding path between the first network hub 120 and at least one other network hub (such as second network hub 122) of the plurality of network hubs 120, 122, 124. In addition, the controller 110 may establish yet another dynamic control policy to establish a third forwarding path between the at least one other network hub (e.g., such as the second network hub 122) and the at least one other network spoke (such as second network spoke 132) associated with the at least one other network hub (the second network hub 122). One or more such forwarding paths may enable the plurality of network spokes 130, 132, 134 to communicate with each other. Thus, in the example set forth above, dynamic control policies established by the controller 110 may enable the first network spoke 130 to communicate with the second network spoke 132 through a path going from the first network spoke 130 to the first network hub 120, then from the first network hub 120 to the second network hub 122, and finally from the second network hub 122 to second network spoke 132.

The auto-provisioning steps described above may dynamically create a hub and spoke topology, and traffic may be engineered through the plurality of network hubs 120, 122, 124 and the plurality of network spokes 130, 132, 134 based on one or more of the dynamic control policies created by the controller 110.

In an embodiment, one or more new network spokes may be added and auto-provisioned in system 100. For example, as an enterprises grows, it may be desirable to add new branch sites (such as at least one new network spoke 130a) to network 140 of system 100. The at least one new network spoke 130a may be in physical or virtual geographic proximity to at least one network hub of the plurality of network hubs 120, 122, 124. In FIG. 1, the new network spoke 130a is shown in geographic proximity to the first network hub 120.

The new network spoke 130a may connect to the controller 110 and receive information regarding the plurality of network hubs 120, 122, 124 in the network. Specifically, the controller 110 may publish one or more properties (a GPS location, a load factor, a hub platform, at least one cloud characteristic, etc.) associated with each of the plurality of network hubs 120, 122, 124 to the new network spoke 130a. The new network spoke 130a may apply its local policy to determine whether to subscribe to at least one of the plurality of network hubs 120, 122, 124. For example, the new network spoke 130a may apply a local policy and decide to subscribe to the first network hub 120 based on, e.g., its GPS location. The new network spoke 130a may transmit new subscription information (i.e., information indicating the new network spoke 130a subscribing to the first network hub 120) to the controller 110. The controller 110 may receive the new subscription information from the at least one new network spoke 130a (the new subscription information indicating the new network spoke 130a subscribing to the first network hub 120 based on the first information). The controller 110 may then create a new dynamic control policy to establish a new forwarding path for the new network spoke 130a through the first network hub 120.

In another embodiment, one or more new network hubs may be added and auto-provisioned to system 100. For example, as more branch sites or network spokes are connecting to the network 140, capacity at a given network hub may begin to decrease. By way of example, in FIG. 1, if new branch sites (such as new network spoke 130a) are added to the network and are connecting to the first network hub 120, the first network hub 120 may reach a threshold capacity, thereby requiring a new network hub in California. As a result, the enterprise may add a new network hub 120a in network 140. The new network hub 120a may be a physical site or may be a virtual hub hosted in the cloud or network 140. The new network hub 120a may advertise its capability to operate as a hub, as well as its properties, to the controller 110. Specifically, the controller 110 may receive "second information" from the new network hub 120a. Second information may correspond to a second set of properties (which may include one or more of a GPS location, a load factor, a hub platform, at least one cloud characteristic, and/or other properties) associated with the new network hub 120a. Next, the controller 110 may publish the second information of the new network hub 120a to the plurality of network spokes 130, 130a, 132, 134. Depending on the local policies of the plurality of network spokes 130, 130a, 132, 134, at least one network spoke from the plurality of network spokes 130, 130a, 132, 134 may determine to subscribe to the new network hub 120a based on the second information. The at least one network spoke may be any of the plurality of network spokes 130, 130a, 132, 134, but for purposes of illustration, the at least one network spoke may be network spoke 130a. The at least one network spoke 130a (which is currently associated with the first network hub 120) may send its updated subscription information (i.e., information indicating that the at least one network spoke 130a is subscribing to the new network hub 120a) to the controller 110. The controller 110 may receive the updated subscription information from the at least one network spoke 130a and update the dynamic control policy based on the updated subscription information to establish an updated forwarding path for the at least one network 130a spoke through the new network hub 120a. In an embodiment, the at least one network spoke 130a may be rebalanced without disruption by establishing the connection to the new network hub 120a prior to breaking the connection to the existing/current network hub 120.

In sum, in accordance with the system 100 of FIG. 1 as described above, network hubs 120, 120a, 122, 124 may advertise their hub capability and properties to the controller 110, the controller 110 may publish the properties to the network spokes 130, 130a, 132, 134, each of the network spokes 130, 130a, 132, 134 may apply a local policy to determine to subscribe to a primary and/or secondary network hub and send its subscription(s) to the controller 110, and the controller 110 may then create a dynamic control policy to establish a forwarding path for each network spoke through the subscribed network hub. In another embodiment, the controller 110 may determine (rather than the network spoke) which network hub a given network spoke may be subscribed to and/or associated with. The controller 110 may make this determination based on its global view of the network 140, including the GPS locations, load factors, and other parameters associated with the plurality of network hubs 120, 120a, 122, 124 and/or network spokes 130, 130a, 132, 134.

Figure 2:
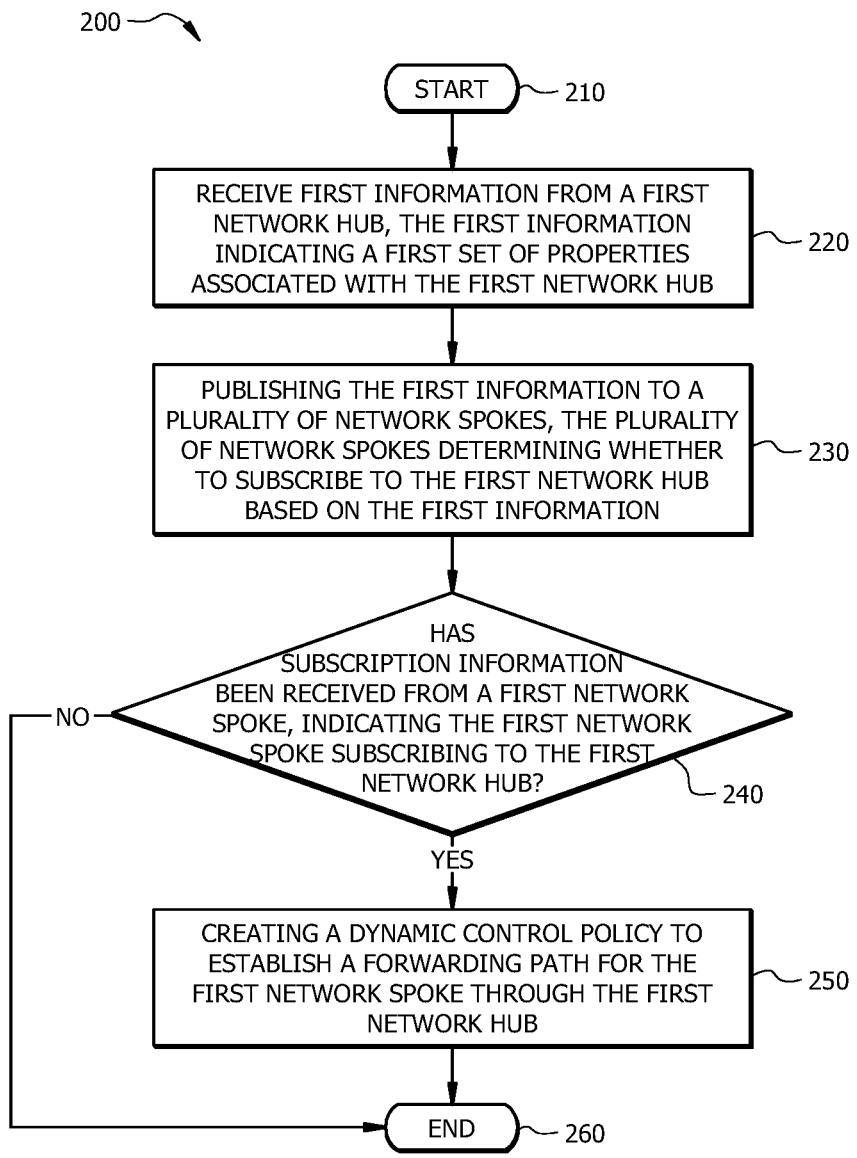
FIG. 2 illustrates a flow diagram of a method for auto-provisioning SD-WAN hubs and spokes, in accordance with certain embodiments.

Reference is now made to FIG. 2, wherein is shown a flow diagram for a method 200 for auto-provisioning SD-WAN hubs and spokes, according to the present disclosure. The method 200 may begin at step 210. At step 220, first information may be received by a controller from a first network hub. The first network hub may comprise one of a plurality of network hubs. The plurality of network hubs may correspond to regional offices of an enterprise. Each network hub may be associated with a particular physical or virtual geographical region. The first information received from the first network hub may indicate a first set of properties associated with the first network hub. The first set of properties may include, by way of example, one or more of a GPS location, a load factor, a platform, at least one cloud characteristic, and/or other such properties of the first network hub, as described above in conjunction with FIG. 1. For purposes of illustration, method 200 describes the controller receiving first information from the first network hub, but it is to be understood that the controller may receive similar information from any or all of the plurality of network hubs in the network.

At step 230, the first information may be published by the controller to a plurality of network spokes, the plurality of network spokes determining whether to subscribe to the first network hub based on the first information. In an embodiment, each of the plurality of network spokes may determine whether to subscribe to the first network hub based on the first information by applying its own local policy. For example, the first network spoke may apply a local policy to determine, based on the GPS location, the load factor, and/or any other property of the first network hub, that it desires to subscribe the first network hub. In an embodiment, the plurality of network spokes may correspond to branch offices of an enterprise. Each network spoke of the plurality of network spokes may be in physical or virtual geographic proximity to at least one network hub of the plurality of network hubs. Additionally, while step 230 describes that the controller publishes the first information of the first network hub to the plurality of network spokes, it is to be understood that the controller may publish information received from any or all of the plurality of network hubs to the plurality of network spokes.

At step 240, a determination may made by the controller as to whether subscription information has been received from a first network spoke. The subscription information may indicate that the first network spoke is subscribing to the first network hub. The first network spoke may have applied a local policy, as described above, to determine whether to subscribe to the first network hub based on the first information. The first network spoke may then transmit (and the controller may receive) subscription information indicating the first network spoke subscribing to the first network hub based on the first information. In an embodiment, the subscription information of the first network spoke may designate the first network hub as its primary hub, and may designate another network hub from the plurality of network hubs as its secondary or backup hub. For purposes of illustration, method 200 describes the controller receiving subscription information from the first network spoke, but it is to be understood that the controller may receive similar subscription information from any of the plurality of network spokes in the network.

If, at step 240, if it is determined that subscription information has not been received from a first network spoke, the method may end at step 260. If, however, at step 240, if it is determined that subscription information has been received from a first network spoke indicating subscription by the first network spoke to the first network hub, the method may proceed to step 250 wherein a dynamic control policy may be created by the controller to establish a forwarding path for the first network spoke through the first network hub. In an embodiment, the dynamic control policy may further include establishing a second forwarding path between the first network hub and at least one other network hub of the plurality of network hubs. In another embodiment, the dynamic control policy may establish a third forwarding path between the at least one other network hub of the plurality of network hubs and a network spoke of the plurality of network spokes. Thus, by way of example, the dynamic control policies established by the controller may enable the first network spoke to communicate with at least one other network spoke through a path going from the first network spoke to the first network hub, then from the first network hub to at least one other network hub, and finally from the at least one other network hub to the at least one other network spoke. At step 260, the method may end.

Figure 3A:
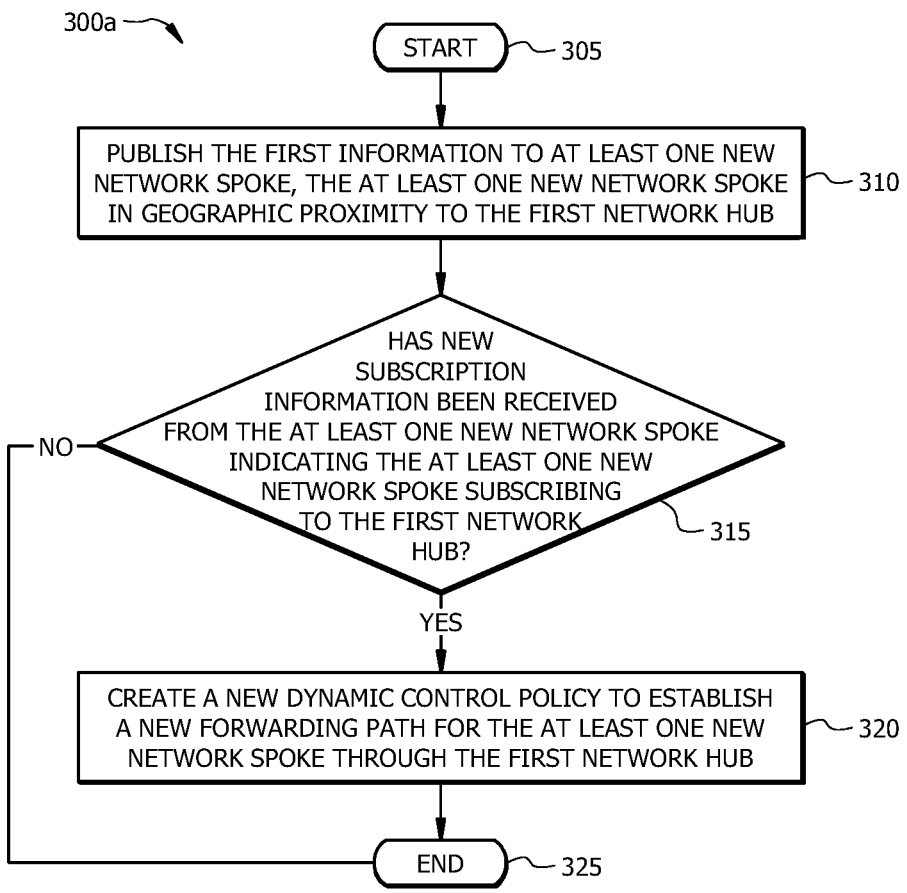
FIG. 3A illustrates a flow diagram of a method for the auto-provisioning of a new spoke, in accordance with certain embodiments.

Reference is now made to FIG. 3A, wherein is shown method 300a, which is a continuation of the flow diagram of the method 200 of FIG. 2. Method 300a depicts a flow diagram for the auto-provisioning of at least one new network spoke that has been added to the network. Because method 300a is a continuation of method 200, terms used in method 300a may correspond to like terms used in method 200. Method 300a may presume that at least one new branch site (or at least one new network spoke) has already been added or spun-up in the network. The at least one new network spoke may connect to the controller and request information regarding the plurality of network hubs in the network, including the first network hub identified in step 220 of FIG. 2. For purposes of illustration, the following method 300a will be described in conjunction with the first network hub (i.e., by way of example, method 300a will presume that the at least one new network spoke which has been added to the network will subscribe to the first network hub), but it is to be understood that method 300a may apply, and the at least one new network spoke may subscribe, to any network hub of the plurality of network hubs in the network.

The method may begin at step 305. At step 310, the first information (received from the first network hub, as described in step 220 of FIG. 2) may be published to the at least one new network spoke, the at least one new network spoke in physical or virtual geographic proximity to the first network hub of the plurality of network hubs. The first information may indicate a first set of properties associated with the first network hub, including by way of example, one or more of a GPS location, a load factor, a platform, at least one cloud characteristic, and/or other such properties of the first network hub. While step 310 describes that the first information of the first network hub is published to the at least one new network spoke, it is to be understood that the controller may publish information received from any or all of the plurality of network hubs to the at least one new network spoke.

At step 315, a determination may be made by the controller as to whether new subscription information has been received from the at least one new network spoke. The new subscription information may indicate that the at least one new network spoke is subscribing to the first network hub. Specifically, the at least one new network spoke may apply a local policy to determine whether to subscribe to the first network hub based on the first information. For example, the at least one new network spoke may apply a local policy and decide to subscribe to the first network hub based on its GPS location, its load factor, and/or any other of its properties. If the at least one new network spoke determines to subscribe to the first network hub, the at least one new network spoke may transmit the new subscription information (i.e., information indicating the at least one new network spoke subscribing to the first network hub) to the controller.

If, at step 315, it is determined that new subscription information has not been received from the at least one new network spoke indicating that it has subscribed to the first network hub, the method may end at step 325. If, however, it is determined that new subscription information has been received from the at least one new network spoke indicating subscription by the at least one new network spoke to the first network hub, the method may proceed to step 320, wherein a new dynamic control policy may be created to establish a new forwarding path for the at least one new network spoke through the first network hub. At step 325, the method may end.

Figure 3B:
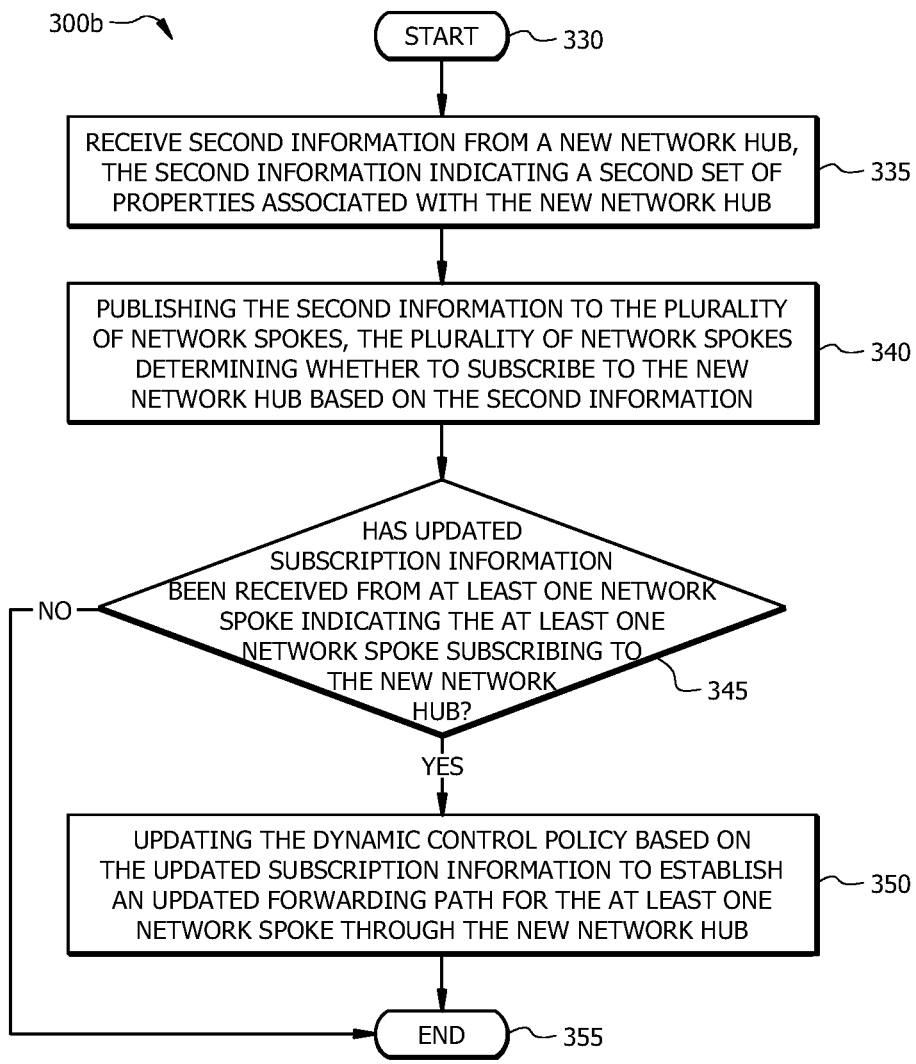
FIG. 3B illustrates a flow diagram of a method for the auto-provisioning of a new hub, in accordance with certain embodiments.

Reference is now made to FIG. 3B, wherein is shown method 300b, which is a continuation of the flow diagram of the method 200 of FIG. 2. Method 300b depicts a flow diagram for the auto-provisioning of a new network hub that has been added to the network. Method 300b presumes that the new network hub has been added in a physical or virtual geographic area where, for example, additional capacity is required. The new network hub may advertise its capability to operate as a hub, as well as its properties, to the controller.

The method may begin at step 330. At step 335, second information may be received by the controller from a new network hub. The second information may indicate a second set of properties associated with the new network hub. Specifically, the second set of properties may include one or more of a GPS location, a load factor, a hub platform, at least one cloud characteristic, and/or other such properties associated with the new network hub. At step 340, the second information may be published by controller to the plurality of network spokes, the plurality of network spokes determining whether to subscribe to the new network hub based on the second information. Depending on the local policies of each of the plurality of network spokes, at least one network spoke from the plurality of network spokes may determine to subscribe to the new network hub based on the second information. If at least one network spoke decides to subscribe to the new network hub, the at least one network spoke may send updated subscription information to the controller.

At step 345, a determination may be made by the controller as to whether updated subscription information has been received from at least one network spoke indicating the at least one network spoke subscribing to the new network hub. If, at step 345, it is determined that updated subscription information has not been received from at least one network spoke, the method may end at step 355. If, however, at step 345, it is determined that updated subscription information has been received from at least one network spoke, the method may proceed to step 350, wherein the dynamic control policy may be updated based on the updated subscription information to establish an updated forwarding path for the at least one network spoke through the new network hub. In an embodiment, the at least one network spoke may be rebalanced without disruption by establishing the connection to the new network hub prior to breaking its connection to the existing/current network hub. The method may end at step 355.

In accordance with the methods 200, 300a, and 300b of FIGS. 2, 3A, and 3B, as described above, the steps of the present disclosure may be generally described as follows: network hubs may advertise their hub capability and properties to a controller, the controller may publish the properties to the network spokes, each of the network spokes may apply a local policy to determine to subscribe to a primary and/or secondary network hub and send its subscription(s) to the controller, and the controller may then create a dynamic control policy to establish a forwarding path for each network spoke through the subscribed network hub. In another embodiment, the controller may determine (rather than the network spoke) which network hub a given network spoke may be subscribed to and/or associated with. The controller may make this determination based on its global view of the network, including the GPS locations, load factors, and other parameters associated with the plurality of network hubs and/or network spokes.

In sum, the systems and methods of the present disclosure may allow for auto-provisioning of hubs and spokes in a SD-WAN hub and spoke topology network. The concepts of the present disclosure define mechanisms and procedures to dynamically and elastically provision hubs and spokes with little or no intervention from a network operator, thereby increasing the efficiency of the network system. In other words, network hub-capable devices may be added, and network spokes may select and connect to them with a zero-touch configuration. Additionally, the auto-provisioning of the hub and spoke tunnels and centralized control policies may reduce the operational cost of adding new spoke sites or redistributing spoke sites when a new hub is added. Moreover, network spokes may be periodically balanced to reflect the addition or removal of network hubs or based on changing requirements in the network.

Figure 4:
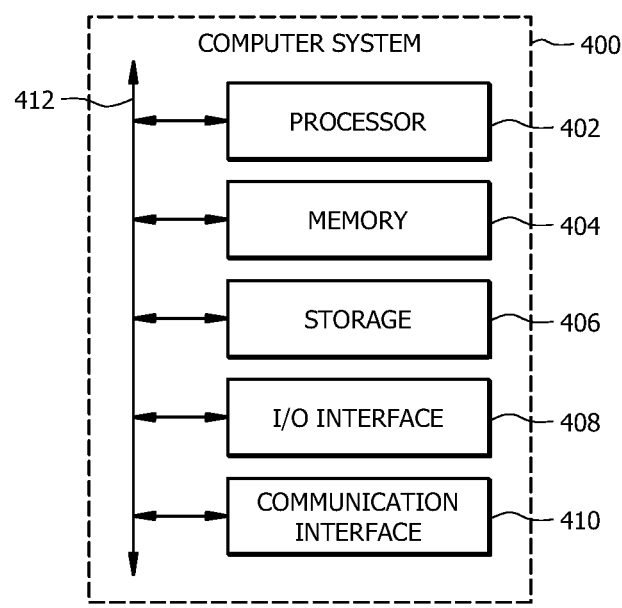
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example, and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend.

The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media comprising instructions that, when executed by the one or more processors, cause one or more components of the system to perform operations comprising:
receiving first information from a first network hub, the first network hub is one of a plurality of network hubs, the first information indicating a first set of properties associated with the first network hub, including at least one measured property of the first network hub, wherein the system controls the plurality of network hubs and automatically manages dynamic control policies for the plurality of network hubs to automatically provision a plurality of network spokes in a network including the plurality of network hubs;

publishing the first information to a plurality of network spokes, the plurality of network spokes determining whether to subscribe to the first network hub of the plurality of network hubs based on applying a corresponding local policy to the first information;

responsive to a first network spoke of the plurality of network spokes determining to subscribe to the first network hub, receiving subscription information from the first network spoke, the subscription information indicating the first network spoke subscribing to the first network hub; and creating at least one dynamic control policy to establish a corresponding forwarding path including at least a first forwarding path for the first network spoke through the first network hub based on the received subscription information, wherein the first network spoke receives traffic from the first network hub via the first forwarding path.

2. The system of claim 1, wherein the first set of properties comprises one or more of a GPS location, a load factor, a platform, and at least one cloud characteristic associated with the first network hub.

3. The system of claim 1, wherein the at least one dynamic control policy further establishes a second forwarding path between the first network hub and at least one other network hub of the plurality of network hubs.

4. The system of claim 3, wherein the at least one dynamic control policy further establishes a third forwarding path between the at least one other network hub and a second network spoke associated with the at least one other network hub.

5. The system of claim 1, wherein traffic is engineered through the plurality of network hubs and the plurality of network spokes based on the created at least one dynamic control policy.

6. The system of claim 1, the operations further comprising:

publishing the first information to at least one new network spoke, the at least one new network spoke in geographic proximity to the first network hub of the plurality of network hubs;

receiving new subscription information from the at least one new network spoke, the new subscription information indicating the at least one new network spoke subscribing to the first network hub based on the first information; and creating a new dynamic control policy to establish a new forwarding path for the at least one new network spoke through the first network hub.

7. The system of claim 1, the operations further comprising:

receiving second information from a new network hub, the second information indicating a second set of properties associated with the new network hub;

publishing the second information to the plurality of network spokes, the plurality of network spokes determining whether to subscribe to the new network hub based on the second information;

receiving updated subscription information from at least one network spoke of the plurality of network spokes, the updated subscription information indicating the at least one network spoke of the plurality of network spokes subscribing to the new network hub; and updating the at least one dynamic control policy based on the updated subscription information to establish an updated forwarding path for the at least one network spoke through the new network hub.

8. A method, comprising:

receiving first information from a first network hub, the first network hub is one of a plurality of network hubs, the first information indicating a first set of properties associated with the first network hub, including at least one measured property of the first network hub, wherein the plurality of network hubs is controlled and automatically manages dynamic control policies for the plurality of network hubs to automatically provision a plurality of network spokes in a network including the plurality of network hubs;

publishing the first information to a plurality of network spokes, the plurality of network spokes determining whether to subscribe to the first network hub of the plurality of network hubs based on applying a corresponding local policy to the first information;

responsive to a first network spoke of the plurality of network spokes determining to subscribe to the first network hub, receiving subscription information from the first network spoke, the subscription information indicating the first network spoke subscribing to the first network hub; and creating at least one dynamic control policy to establish a corresponding forwarding path including at least a first forwarding path for the first network spoke through the first network hub based on the received subscription information, wherein the first network spoke receives traffic from the first network hub via the first forwarding path.

9. The method of claim 8, wherein the first set of properties comprises one or more of a GPS location, a load factor, a platform, and at least one cloud characteristic associated with the first network hub.

10. The method of claim 8, wherein the at least one dynamic control policy further establishes a second forwarding path between the first network hub and at least one other network hub of the plurality of network hubs.

11. The method of claim 10, wherein the at least one dynamic control policy further establishes a third forwarding path between the at least one other network hub and a second network spoke associated with the at least one other network hub.

12. The method of claim 8, wherein traffic is engineered through the plurality of network hubs and the plurality of network spokes based on the created at least one dynamic control policy.

13. The method of claim 8, further comprising:

publishing the first information to at least one new network spoke, the at least one new network spoke in geographic proximity to the first network hub of the plurality of network hubs;

receiving new subscription information from the at least one new network spoke, the new subscription information indicating the at least one new network spoke subscribing to the first network hub based on the first information; and creating a new dynamic control policy to establish a new forwarding path for the at least one new network spoke through the first network hub.

14. The method of claim 8, further comprising:

receiving second information from a new network hub, the second information indicating a second set of properties associated with the new network hub;

publishing the second information to the plurality of network spokes, the plurality of network spokes determining whether to subscribe to the new network hub based on the second information;

receiving updated subscription information from at least one network spoke of the plurality of network spokes, the updated subscription information indicating the at least one network spoke of the plurality of network spokes subscribing to the new network hub; and updating the at least one dynamic control policy based on the updated subscription information to establish an updated forwarding path for the at least one network spoke through the new network hub.

15. One or more computer-readable non-transitory storage media embodying instructions that, when executed by a processor, cause performance of operations comprising:

receiving first information from a first network hub, the first network hub is one of a plurality of network hubs, the first information indicating a first set of properties associated with the first network hub, including at least one measured property of the first network hub, wherein the plurality of network hubs is controlled and automatically manages dynamic control policies for the plurality of network hubs to automatically provision a plurality of network spokes in a network including the plurality of network hubs;

publishing the first information to a plurality of network spokes, the plurality of network spokes determining whether to subscribe to the first network hub of the plurality of network hubs based on applying a corresponding local policy to the first information;

responsive to a first network spoke of the plurality of network spokes determining to subscribe to the first network hub, receiving subscription information from the first network spoke, the subscription information indicating the first network spoke subscribing to the first network hub; and creating at least one dynamic control policy to establish a corresponding forwarding path including at least a first forwarding path for the first network spoke through the first network hub based on the received subscription information, wherein the first network spoke receives traffic from the first network hub via the first forwarding path.

16. The one or more computer-readable non-transitory storage media of claim 15, wherein the first set of properties comprises one or more of a GPS location, a load factor, a platform, and at least one cloud characteristic associated with the first network hub.

17. The one or more computer-readable non-transitory storage media of claim 15, wherein the at least one dynamic control policy further establishes a second forwarding path between the first network hub and at least one other network hub of the plurality of network hubs.

18. The one or more computer-readable non-transitory storage media of claim 17, wherein the at least one dynamic control policy further establishes a third forwarding path between the at least one other network hub and a second network spoke associated with the at least one other network hub.

19. The one or more computer-readable non-transitory storage media of claim 15, the operations further comprising:

publishing the first information to at least one new network spoke, the at least one new network spoke in geographic proximity to the first network hub of the plurality of network hubs;

receiving new subscription information from the at least one new network spoke, the new subscription information indicating the at least one new network spoke subscribing to the first network hub based on the first information; and creating a new dynamic control policy to establish a new forwarding path for the at least one new network spoke through the first network hub.

20. The one or more computer-readable non-transitory storage media of claim 15, the operations further comprising:

receiving second information from a new network hub, the second information indicating a second set of properties associated with the new network hub;

publishing the second information to the plurality of network spokes, the plurality of network spokes determining whether to subscribe to the new network hub based on the second information;

receiving updated subscription information from at least one network spoke of the plurality of network spokes, the updated subscription information indicating the at least one network spoke of the plurality of network spokes subscribing to the new network hub; and updating the at least one dynamic control policy based on the updated subscription information to establish an updated forwarding path for the at least one network spoke through the new network hub.

* * * * *